March 4, 1952 — H. W. HAPMAN — 2,588,233
SEDIMENT SETTLING AND REMOVING DEVICE
Filed Oct. 2, 1947 — 2 SHEETS—SHEET 1

Inventor
Henry W. Hapman
Barthel & Bugbee
Attorneys

March 4, 1952  H. W. HAPMAN  2,588,233
SEDIMENT SETTLING AND REMOVING DEVICE
Filed Oct. 2, 1947  2 SHEETS—SHEET 2

Inventor
Henry W Hapman
By Barthel & Bugbee
Attorneys

Patented Mar. 4, 1952

2,588,233

UNITED STATES PATENT OFFICE 2,588,233

SEDIMENT SETTLING AND REMOVING DEVICE

Henry W. Hapman, Detroit, Mich., assignor, by mesne assignments, of forty per cent to Hannah Jane Hapman, Detroit, Mich.

Application October 2, 1947, Serial No. 777,441

3 Claims. (Cl. 210—55)

This invention relates to sediment settling and removing devices.

One object of this invention is to provide a sediment settling and removing device wherein two stages of settling are accomplished in a single unit or tank with a single conveyor removing the sediment from both stages.

Another object is to provide a sediment settling and removing device wherein the sediment-contaminated liquid first flows into one compartment of the two-stage tank and thence over a barrier into another compartment thereof, the sediment in each compartment being removed by a single conveyor which crosses the bottom of each compartment and discharges the sediment into a suitable container, the two compartments preferably having V-shaped bottoms to facilitate the settling of the sediment downward toward the conveyor.

Another object is to provide a sediment settling and removing device wherein a two-stage tank is provided with two compartments separated by a baffle structure giving a circuitous path between the two compartments of the tank, the inlet to the first compartment being so arranged as to greatly retard the velocity of flow of the incoming liquid, preferably by providing an inlet pipe from which the contaminated liquid flows into the first compartment through a large number of small holes in the side wall of the pipe over a considerable length thereof, the aggregate area of the small holes being preferably greater than the cross-sectional area of the inlet pipe so as to insure this retardation of flow.

Figure 1:
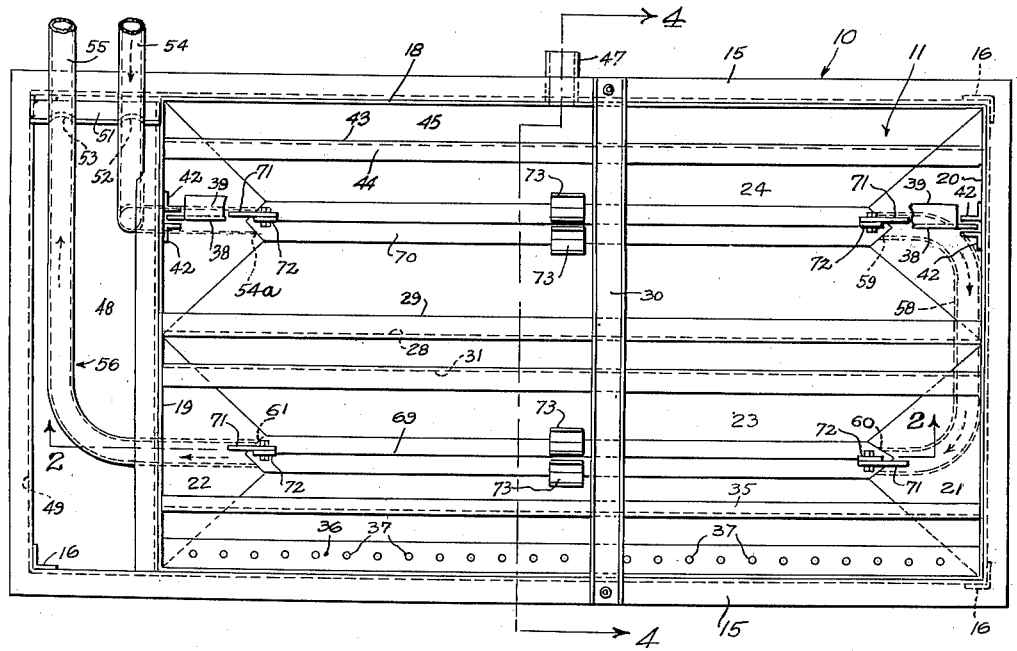
Figure 1 is a top-plan view of a sediment settling and removing device according to a preferred form of the invention, with the upper portion of the conveyor and its driving mechanism omitted.

Hitherto the removal of sediment from sediment-contaminated liquids such as coolant liquids has presented formidable problems, especially in attempting to remove the sediment from such liquids in a short time. The removal of such sediment at a rapid rate has hitherto been incompatible with compactness of apparatus. In modern industrial plants, however, space is at a premium and the great amount of floor space taken up by previous settling devices has formed a serious disadvantage and constituted an apparently necessary evil.

The sediment settling and removing device of the present invention enables rapid settling to be accomplished and yet compactness of apparatus to be achieved by dividing the settling tank into two stages separated by a barrier, preferably of circuitous-path-baffles. The bottoms of the two compartments of the tank forming the two stages of settling are preferably of V-shaped cross-section and a flight conveyor is arranged so that its opposite courses traverse the troughs at the lowest level of these V-bottom compartments.

The entering course of the conveyor first traverses the V-bottom of the second stage or clean fluid compartment of the tank, where it receives a comparatively small amount of sediment and conveys this into the first stage and across the V-bottom thereof, picking up the much greater amount of sediment on the bottom of the first stage. In this manner the conveyor does not contaminate the relatively clean liquid which has passed over the barrier and past the baffles between the first and second stages of the apparatus. The contaminated liquid enters the first stage through a pipe, the side wall of which is pierced with small holes, but the aggregate area of these small holes preferably exceeds the cross-sectional area of the inlet pipe so that the velocity of flow of the incoming fluid is rapidly retarded as it enters the first stage.

Referring to the drawings in detail, Figures 1 to 4 inclusive show a sediment settling and removing device generally designated 10 according to a preferred form of the invention as consisting generally of a double compartment V-bottom tank 11 served by a flight conveyor 12 arranged in a particular manner as set forth below. The tank 11 is supported by a framework 13 consisting of horizontal bottom and top members 14 and 15 of channel and angle cross sections respectively, together with angle members 16 interconnecting these members 14 and 15. The tank 11 is provided with side walls 17 and 18 (Figure 4) and end walls 19 and 20 (Figure 2), the latter being downwardly inclined portions 21 and 22. The tank 11 is provided with first stage and second stage compartments 23 and 24 (Figure 4) each having sloping V-bottom walls 25 and 26 respectively. The inner bottom walls 25 and 26 meet along a junction line 27 (Figure 4) from which a baffle or barrier 28 rises upward to a top ledge 29. Detachably secured to the top of the tank 11 is a channel cross-member 30 from which a baffle 31 extends downward into the first stage compartment 23 parallel to the baffle 28 and terminating in a lower ledge 32. The baffles 28 and 31 thus form an elongated passageway 33 extending upward from the compartment 23 to the upper portion of the compartment 24.

The first stage compartment 23 is provided with an inlet chamber 34 (Figure 4) having a downwardly-extending side wall or inlet partition 35 and a bottom wall 36 pierced with multiple small holes 37, the aggregate area of which preferably exceeds the cross-sectional area of the liquid inlet pipe (not shown). The second stage compartment 24 is provided with a downwardly-extending baffle 38, the upper flanged edge 39 of which is secured to the cross member 30 and the lower flanged edge 40 of which rests upon ledges 41 formed by angle members secured as by welding to the opposite ends 19 and 20 of the tank 11. The flanges 39 and 40 are cut away at the opposite ends of the baffle 38 so that the latter may be removably held between parallel elongated vertical angle members 42 also secured as by welding to the walls 19 and 20.

The second stage compartment 24 (Figure 4) is also provided with an outlet baffle or partition 43 having a flanged top edge 44 over which the clean liquid passes downward into an outlet passageway 45 between it and the side wall 18. The baffle 43 is formed with a lower horizontal wall 46 which forms the bottom of the outlet passageway 45 and which communicates with the outlet conduit 47 which is substantially upon the level of the bottom wall 45. The baffle 43 (Figure 1) extends the entire length of the tank 11 and is secured as by welding to the opposite end walls 19 and 20.

Figure 2:
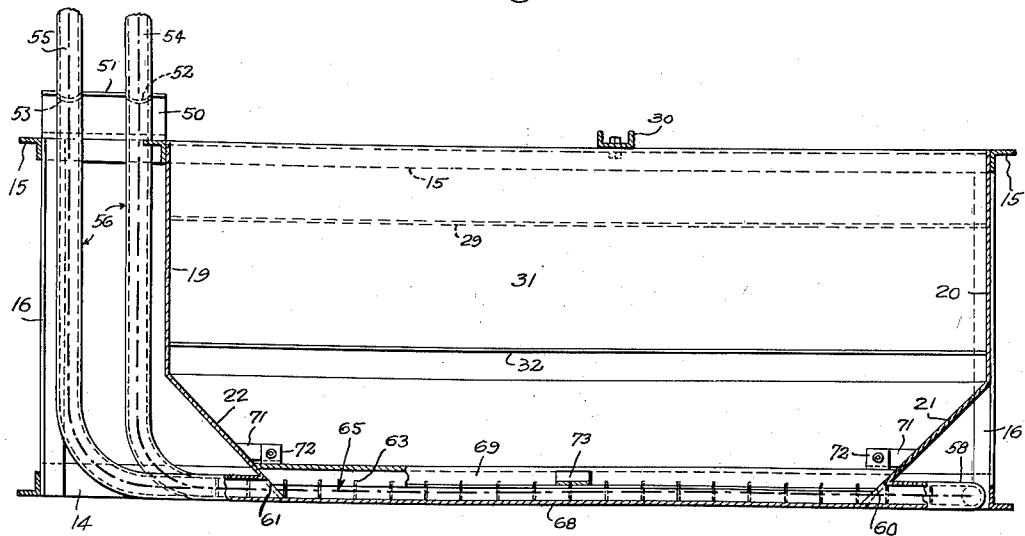
Figure 2 is a longitudinal section along the line 2—2 in Figure 1.

The tank 11 beyond the end wall 19 (Figures 1 and 2) is provided with a conveyor conduit space 48. An upwardly-inclined bridge member 50 is mounted upon the angle members 15 and has its upper edge 51 extending across the top of the compartment 48 and provided with notches 52 and 53 which serve as rests for the parallel inlet and outlet portions 54 and 55 respectively of a conveyor conduit generally designated 56 which forms a part of a flight conveyor generally designated 57. The inlet conduit 54 is connected to the inlet port 54a leading into one end of the second stage compartment 24 whereas a U-shaped conduit 58 leads from the outlet port 59 of the second stage compartment 24 to the inlet port 60 of the first stage compartment 23. The inlet and outlet conduit portions 54 and 55 slant upward in space 48. The conduit 55 is connected to the outlet port 61 of the first stage compartment 23 (Figure 2). The upper ends of the conveyor conduit portions 54 and 55 are bell-mouthed as at 62 (Figure 3) in order to facilitate the passage of the flights 63 on the endless conveyor chain 64 forming the movable endless conveyor 65. The latter is driven by a driving mechanism 66. The conveyor conduit generally designated 56, the endless conveyor 65 and the driving mechanism 66 in assembly comprise the flight conveyor 57. The conveyor chain 64 and its flights 63 may be of any convenient type such as those shown in my Patent Number 2,557,963, issued June 26, 1951. As shown therein, the flights 63 are preferably of elastic deformable material such as rubber or synthetic rubber so that they pass easily through the bent portions of the conveyor conduit 56 without the need for sprockets at the bottom of the tank 11.

The endless conveyor 65 passes through the troughs 67 and 68 (Figure 4) formed by the V-bottoms 25 and 26 of the tank 11 and is held within these troughs by elongated angle members 69 and 70 serving as hold-down rails preventing the flights 63 from moving upward. The angle members 69 and 70 are secured to brackets 71 welded or otherwise attached to the end walls 21 and 22 (Figure 2) by means of lugs 72 bolted thereto and welded to the upper edges of the members 69 and 70. The members 69 and 70 at their mid-portions are also held down by angle brackets 73 (Figures 1 and 4) welded to the inclined bottom wall portions 25 and 26.

The upper end of the endless conveyor chain 64 encircles a sprocket 74 (Figure 3) mounted on the shaft 75 of the conveyor driving mechanism 66. The shaft 75 is journaled in a slide 76 and is connected to a conventional reduction gear box 77 mounted on the slide 76 and having an input shaft 78 carrying a pulley 79. The input shaft 78 is journaled in the gear box housing 80 and is driven by a belt 81 which encircles the pulley 79 and also the drive pulley 82 mounted upon the armature shaft 83 of an electric motor 84. The latter is mounted upon the slide 76 which slidably engages a support 85 in the form of an elongated rectangle plate secured at its lower end to the conveyor conduit portions 54 and 55 and extending between them. The plate 85 is provided with an elongated aperture 86 through which the output shaft 75 extends.

In order to adjustably move the slide 76 to and fro along the support 85 and thereby adjust the tension of the conveyor chain 64, the slide 76 and support 85 are provided with transversely extending arms 87 and 88. An adjusting screw shaft 89 is mounted upon the arm 87 and extends through a hole in the arm 88 beyond which it is provided with one or more nuts 90 by which it is adjusted and locked in its adjusted position. A drip plate 91 welded to the conveyor conduit portions 54 and 55 (Figure 3) beneath their bell-mouthed ends 62 serves to catch and deflect the sediment or sludge emerging from the conveyor conduit portion 55.

Figure 4:
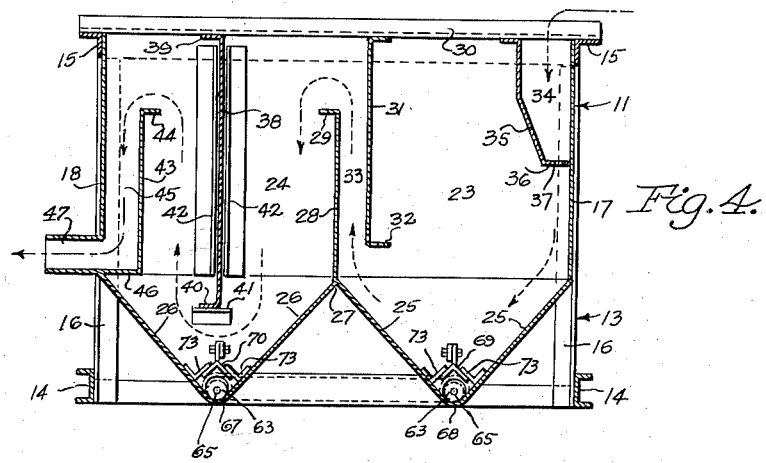
Figure 4 is a cross-section along the line 4—4 in Figure 1.
Figure 3:
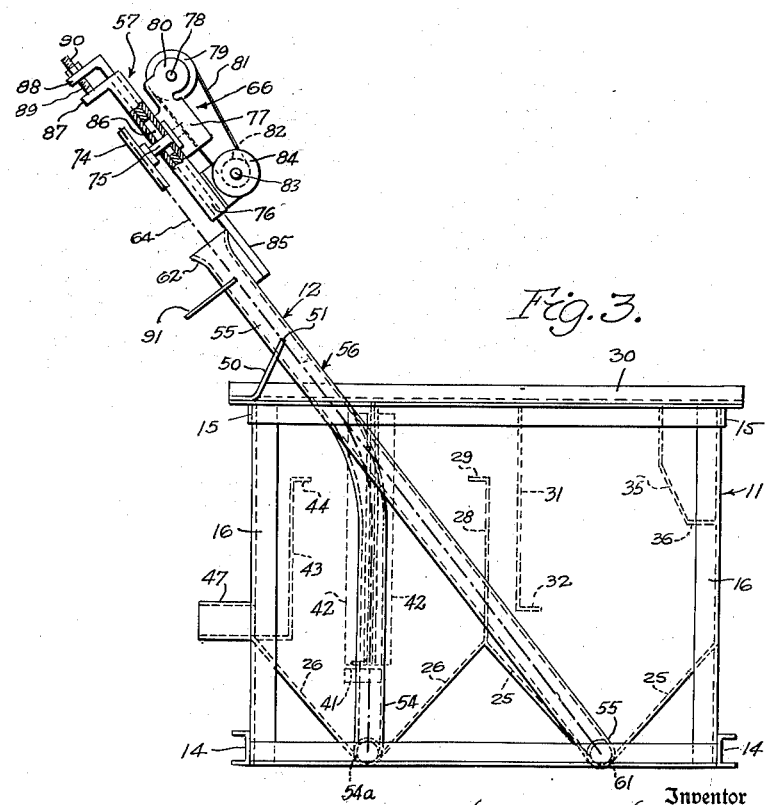
Figure 3 is a left-hand end elevation of the device shown in Figure 1.

In the operation of the invention, the sediment-contaminated liquid, such as a coolant liquid containing sludge, is discharged into the compartment 34 from any suitable conduit or trough (not shown) leading from the machines or other sources of contaminated liquid. Although the liquid possibly is discharged into the compartment 34 at a high velocity, the small holes 37 cause its velocity to be reduced so that it emerges in the first stage compartment 23 at a comparatively low velocity. The contaminated or dirty liquid in the compartment 23 flows across the compartment in the direction of the arrows, the heavier particles of the sediment settling out as the liquid passes upward through the passageway 33 and over the ledge 29 at the top of the baffle 28. The liquid is drawn through the passageway 33 by a pump (not shown) connected to the outlet conduit 47 (Figures 1, 3 and 4). The finer particles of sediment settle out from the liquid as it passes downward in a U-shaped path through the second stage compartment 24, as indicated by the arrows, flowing beneath the removable baffle 38 and upward over the top ledge 44 of the partition 43. As the liquid passes downward into the outlet passageway 45 it is ordinarily sufficiently free from the sediment particles with which it was contaminated. If additional sediment removal is needed, filter screens of a conventional type are provided (not shown) such filters forming no part of the present invention.

Meanwhile the motor 84 has been started causing the endless conveyor 65 to pursue a circuitous path through the conveyor conduit 56. The conveyor chain 64 with its flights 63 first passes downward through the conduit portion 54 in the direction of the arrows (Figures 1 and 2) and then horizontally along the trough portion 67 of the second stage or clean liquid compartment 24 where it removes the residual sediment which has settled out from the comparatively clean liquid in the second stage compartment 24. The endless conveyor 65 then passes through the U-shaped conduit 58 and into the first stage or dirty liquid compartment 23 where it passes along the trough portion 68 and collects the heavy sediment or sludge which has settled out of the liquid as it passes through the compartment 23. The flight conveyor 35 then passes through the port 61 and conduit portion 55 and outward through the bell-mouthed portion 62 discharging the sludge. The latter falls downward upon the drip plate 91 which serves as a deflector plate, and into a suitable bucket or other sludge container (not shown). The bucket is emptied from time to time or mounted on a car and carried away in a manner familiar to those skilled in this art.

In this manner the flight conveyor 65 moves in the opposite direction to the liquid in the tank 11, in that it first traverses the bottom of the second stage compartment 24 and afterward traverses that of the first stage compartment 23. Thus the conveyor avoids contaminating the clean liquid in the compartment 24 with sludge or sediment collected from the dirty liquid in the first stage compartment 23.

The tension of the endless conveyor 65 is adjusted by moving the slide 76 to and fro along the support 85. This is done by tightening or loosening the nut 90 upon the screw shaft 89. The rubber-like flights 63 of the flight conveyor 65 move easily around the bends in the portions 54, 58 and 55 of the conveyor conduit 56 without any need for guide sprockets at such bends. The baffle 38 is readily removed, when necessary, by unbolting the channel cross-member 30 from the upper angle members 15 at the top of the tank 11. Thus all parts of the tank are conveniently accessible for cleaning or repair purposes. The sediment settling and removing device 10 of this invention is thus self-cleaning and performs a rapid renovation of the sediment contaminated liquid which is fed to it.

What I claim is:

1. A purifying apparatus for sediment-bearing liquids comprising a tank having first and second settling compartments disposed side by side, said compartments having V-bottoms with approximately parallel bottom trough portions at substantially their lowest points, a barrier structure extending lengthwise of and between said compartments and separating said compartments from one another, said barrier structure having a liquid overflow portion disposed above and remote from said bottom trough portion, liquid inlet and outlet conduits communicating respectively with said first and second compartments to supply sediment-bearing liquid to said first compartment and withdraw clarified liquid from said second compartment in a direction of flow transverse to said bottom trough portions and to said barrier structure, a conveyor inlet passageway extending from the exterior of said tank into said bottom trough portion of said second compartment, a connecting passageway extending between and interconnecting said trough portions, a conveyor discharge passageway extending from said bottom trough portion of said first compartment to a point of sediment disposal, a single endless flight conveyor extending through said inlet passageway said bottom trough portions, said connecting passageway and said discharge passageway; and a prime mover drivingly connected to said conveyor and arranged to drive said conveyor in a direction along the second compartment trough portion and thereafter along the first compartment trough portion to a point of sediment disposal.

2. A purifying apparatus for sediment-bearing liquids comprising a tank having first and second settling compartments disposed side by side, said compartments having V-bottoms with approximately parallel bottom trough portions at substantially their lowest points, a barrier structure extending lengthwise of and between said compartments and separating said compartments from one another, said barrier structure having a liquid overflow portion disposed above and remote from said bottom trough portion, liquid inlet and outlet conduits communicating respectively with said first and second compartments to supply sediment-bearing liquid to said first compartment and withdraw clarified liquid from said second compartment in a direction of flow transverse to said bottom trough portions and to said barrier structure, a conveyor inlet passageway extending from the exterior of said tank into said bottom trough portion of said second compartment, a connecting passageway extending between and interconnecting said trough portions, a conveyor discharge passageway extending from said bottom trough portion of said first compartment to a point of sediment disposal, a single endless flight conveyor extending through said inlet passageway said bottom trough portions, said connecting passageway and said discharge passageway; and a prime mover drivingly connected to said conveyor and arranged to drive said conveyor in a direction along the second compartment trough portion and thereafter along the first compartment trough portion to a point of sediment disposal, said barrier structure including a first baffle member extending upwardly from the bottom of said tank with its upper edge disposed below the intended liquid level in said tank, and a second baffle member spaced horizontally away from said first baffle member and extending downwardly from the top of said tank with its lower edge spaced above said bottom.

3. A purifying apparatus for sediment-bearing liquids comprising a tank having first and second settling compartments disposed side by side, said compartments having V-bottoms with approximately parallel bottom trough portions at substantially their lowest points, a barrier structure extending lengthwise of and between said compartments and separating said compartments from one another, said barrier structure having a liquid overflow portion disposed above and remote from said bottom trough portion, liquid inlet and outlet conduits communicating respectively with said first and second compartments to supply sediment-bearing liquid to said first compartment and withdraw clarified liquid from said second compartment in a direction of flow transverse to said bottom trough portions and to said barrier structure, a conveyor inlet passageway extending from the exterior of said tank into said bottom trough portion of said second compartment, a connecting passageway extending between and interconnecting said trough portions, a conveyor discharge passageway extending from said bottom trough portion of said first compartment to a point of sediment disposal, a single endless flight conveyor extending through said inlet passageway said bottom trough portions, said connecting passageway and said discharge passageway; and a prime mover drivingly connected to said conveyor and arranged to drive said conveyor in a direction along the second compartment trough portion and thereafter along the first compartment trough portion to a point of sediment disposal, said barrier structure including alternating substantially vertical baffles spaced horizontally away from one another across said tank, certain of said baffles extending upwardly from the lower portions of said tank and having upper overflow edges spaced below the intended liquid level in said tank, and others of said baffles extending downwardly from the upper portions of said tank and having lower underflow edges spaced above the bottom of said tank.

HENRY W. HAPMAN.

REFERENCES CITED

The following references are of record in the file of this patent:

UNITED STATES PATENTS

| Number | Name | Date |
|---|---|---|
| 602,515 | McClatchey et al. | Apr. 19, 1898 |
| 1,044,844 | Argall | Nov. 19, 1912 |
| 2,058,044 | Spencer | Oct. 20, 1936 |
| 2,064,792 | Fischer | Dec. 15, 1936 |
| 2,322,415 | Buckbee | June 22, 1943 |
| 2,432,756 | Hapman | Dec. 16, 1947 |

FOREIGN PATENTS

| Number | Country | Date |
|---|---|---|
| 11,801 | Great Britain | Aug. 16, 1915 |
| 122,493 | Germany | July 29, 1901 |
| 343,025 | Germany | Oct. 27, 1921 |
| 23,611 | Norway | July 28, 1913 |